(12) United States Patent
Ende et al.

(10) Patent No.: US 11,060,641 B2
(45) Date of Patent: Jul. 13, 2021

(54) METHOD FOR PRODUCING A FLANGE BLANK AND FOR PRODUCING A FLANGE

(71) Applicant: MINIMAX GMBH & CO. KG, Bad Oldesloe (DE)

(72) Inventors: Ralf Ende, Bad Oldesloe (DE); Frank Stachowitz, Ratzeburg (DE); Peter Kempf, Bad Oldesloe (DE); Matthias Pohl, Stubben (DE)

(73) Assignee: MINIMAX GMBH & CO. KG, Bad Oldesloe (DE)

( * ) Notice: Subject to any disclaimer, the term of this patent is extended or adjusted under 35 U.S.C. 154(b) by 63 days.

(21) Appl. No.: 15/779,899

(22) PCT Filed: Nov. 30, 2016

(86) PCT No.: PCT/EP2016/079180
§ 371 (c)(1),
(2) Date: May 30, 2018

(87) PCT Pub. No.: WO2017/093275
PCT Pub. Date: Jun. 8, 2017

(65) Prior Publication Data
US 2018/0363816 A1 Dec. 20, 2018

(30) Foreign Application Priority Data
Dec. 1, 2015 (DE) .................... 10 2015 223 874.1

(51) Int. Cl.
*F16L 23/032* (2006.01)
*B22D 25/02* (2006.01)
*B23B 41/00* (2006.01)

(52) U.S. Cl.
CPC ............ *F16L 23/032* (2013.01); *B22D 25/02* (2013.01); *B23B 41/00* (2013.01); *B23B 2215/72* (2013.01)

(58) Field of Classification Search
CPC .......... F16L 23/032; B22D 19/00; B23B 41/00
See application file for complete search history.

(56) References Cited

U.S. PATENT DOCUMENTS 2,412,487 A * 12/1946 Amley .................. F16L 23/032
285/328
2,859,052 A * 11/1958 Corbeels ................ H01P 1/042
285/18

(Continued)

FOREIGN PATENT DOCUMENTS

CN 2230863 Y 7/1996
CN 1314560 A 9/2001

(Continued)

OTHER PUBLICATIONS

Machine Translation for the Abstract for EP-0315723-A1 (Year: 1989).*

(Continued)

*Primary Examiner* — Jacob J Cigna
*Assistant Examiner* — Michael W Hotchkiss
(74) *Attorney, Agent, or Firm* — Perkins Coie LLP

(57) ABSTRACT

The invention relates to a method for producing a flange blank (1), comprising the following step: producing a base body (3), wherein the base body (3) comprises a fluid passage (5), a support section (7) having a first material thickness (M1) and a force-absorbing section (9) having a second material thickness (M2), the second material thickness (M2) is greater than the first material thickness (M1), and the force-absorbing section (9) is configured for the selective production of through-holes (15a-15h, 17a-17l) according to a first drilling pattern and/or a second drilling pattern. The invention further relates to a method for producing a flange (100). In addition, the invention relates to a flange blank (1).

16 Claims, 4 Drawing Sheets

(56) References Cited

U.S. PATENT DOCUMENTS

| | | | | |
|---|---|---|---|---|
| 3,497,937 | A | * | 3/1970 | Willerpaulg ............ B22D 19/00 29/894.34 |
| 3,650,550 | A | * | 3/1972 | West ...................... B29C 63/346 285/55 |
| 3,756,274 | A | | 9/1973 | Wolfgramm |
| 3,769,696 | A | * | 11/1973 | Awano ................. H02K 15/022 29/598 |
| 3,781,043 | A | * | 12/1973 | Hagmann ............. F16L 23/003 285/363 |
| 5,437,482 | A | * | 8/1995 | Curtis ................... F16L 23/028 285/148.13 |
| 5,645,363 | A | * | 7/1997 | Dafforn ................. B60K 17/28 403/3 |
| 5,899,507 | A | * | 5/1999 | Schroeder ............ E21B 17/085 285/288.1 |
| 6,364,425 | B1 | * | 4/2002 | Marquis ............... B22D 15/005 301/65 |
| 6,425,243 | B1 | * | 7/2002 | Chen ...................... B21D 53/88 60/313 |
| 6,514,147 | B2 | * | 2/2003 | Aoki ........................ F16D 3/78 464/98 |
| 6,581,941 | B2 | * | 6/2003 | Carr ....................... F16J 15/061 277/608 |
| 6,712,403 | B1 | * | 3/2004 | Dusevic ................ F16L 23/032 285/363 |
| 7,644,962 | B2 | * | 1/2010 | Crouse .................. F16L 23/032 285/412 |
| 8,033,581 | B2 | * | 10/2011 | Crouse .................. F16L 23/032 285/412 |
| 9,470,348 | B1 | * | 10/2016 | Bass ......................... B67D 1/00 |
| 10,408,280 | B2 | * | 9/2019 | Swanson ................. F16D 35/00 |
| 10,450,823 | B1 | * | 10/2019 | Pruitt ....................... E21B 17/02 |
| 2011/0204626 | A1 | * | 8/2011 | Degutis .................. F16L 47/14 285/415 |
| 2011/0304138 | A1 | * | 12/2011 | Commoner ........... F16L 23/032 285/368 |

FOREIGN PATENT DOCUMENTS

| | | | |
|---|---|---|---|
| CN | 2630613 | Y | 8/2004 |
| CN | 101251211 | A | 8/2008 |
| CN | 201680085 | U | 12/2010 |
| CN | 204805734 | U | 11/2015 |
| DE | 2 119 224 | | 11/1972 |
| DE | 10 2005 046261 | A1 | 4/2007 |
| DE | 10 2004 064 237 | B3 | 10/2014 |
| EP | 0 249 133 | A2 | 12/1987 |
| EP | 0 315 723 | A1 | 5/1989 |
| EP | 0315723 | A1 * | 5/1989 ............ F16L 23/032 |
| EP | 0 878 644 | A1 | 11/1998 |
| EP | 2 565 591 | A1 | 3/2013 |
| EP | 3073166 | B1 * | 5/2017 .......... F16L 23/0283 |
| KR | 100368514 | B1 * | 1/2003 |

OTHER PUBLICATIONS

Machine Translation of the Description for KR-100368514-B1 (Year: 2003).*
Machine Translation for the Description for EP-0315723-A1 (Year: 1989).*
Machine Translation for the Description for EP-0315723-A1 Abstract (Year: 1989).*
EP-3073166-B1 Machine Translation (Year: 2017).*
International Searching Authority, International Search Report in German & English translation in International Appln. No. PCT/EP2016/079180, dated Feb. 16, 2017, 5 pages.
International Searching Authority, Written Opinion in German and English translation in International Appln. No. PCT/EP2016/079180, dated Feb. 16, 2017, 12 pages.
Office Action with English translation, Chinese Application No. 201680070772.X, 18 pages (dated Sep. 9, 2019).

* cited by examiner

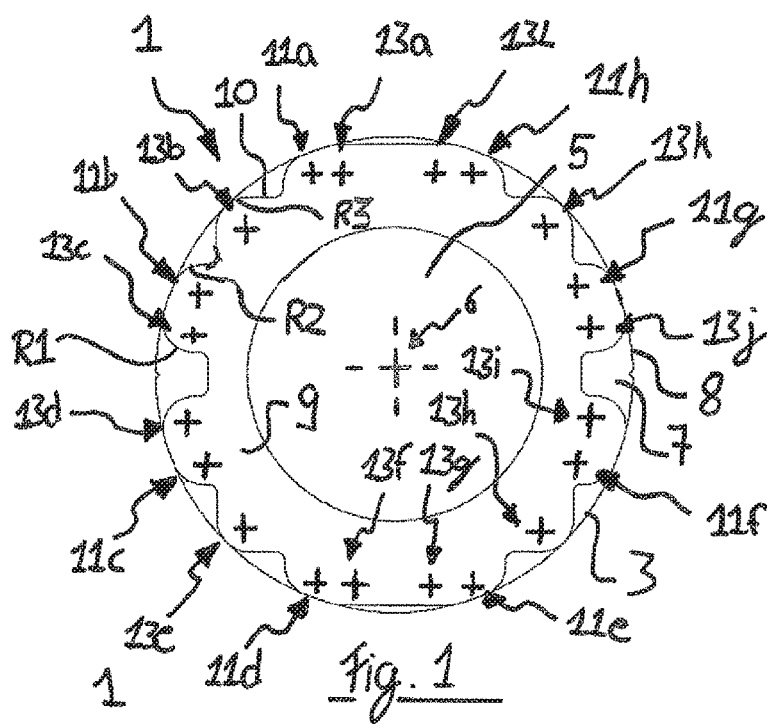
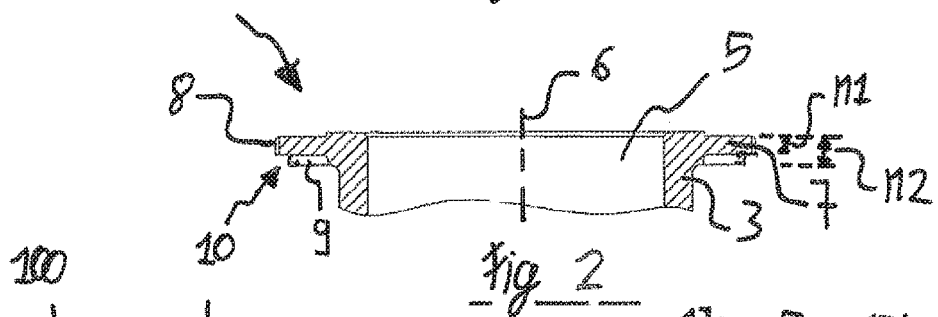
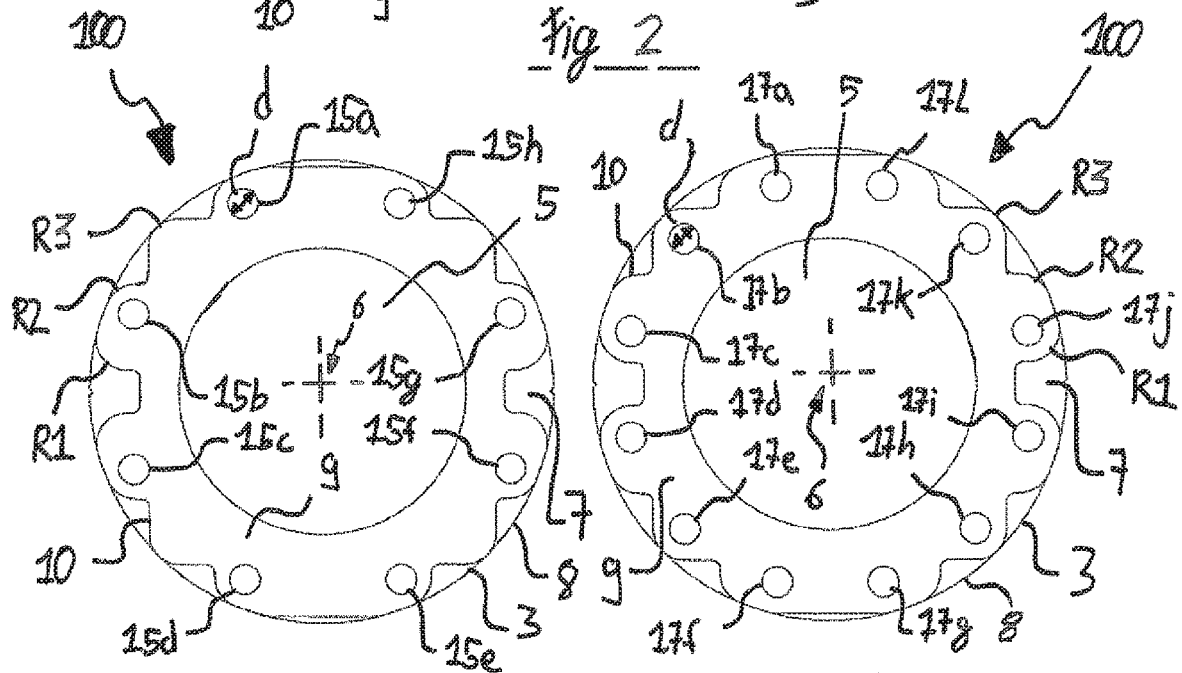

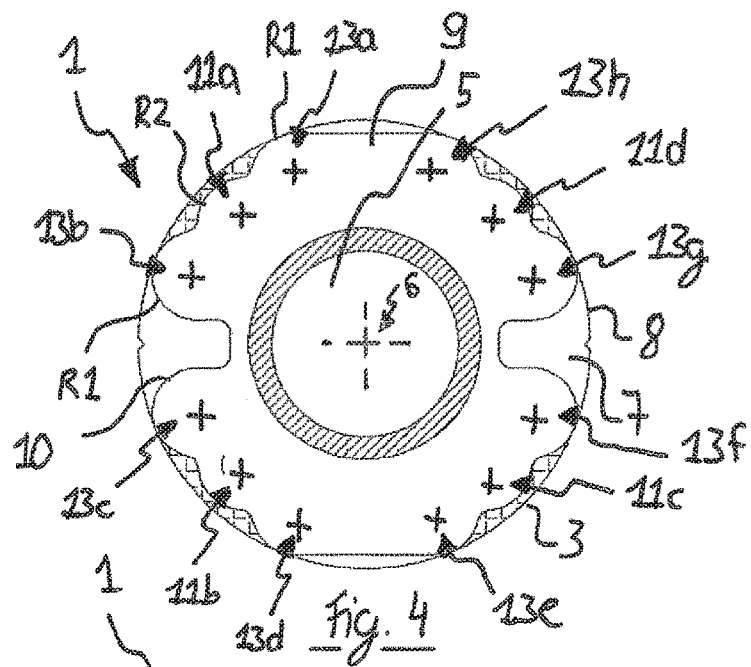
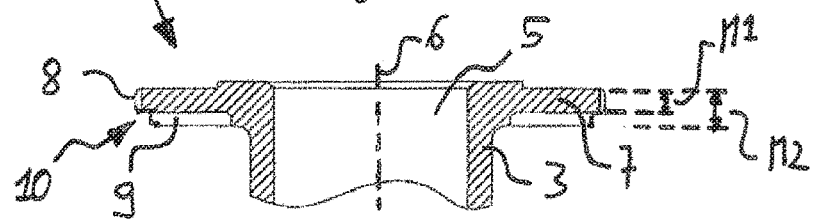
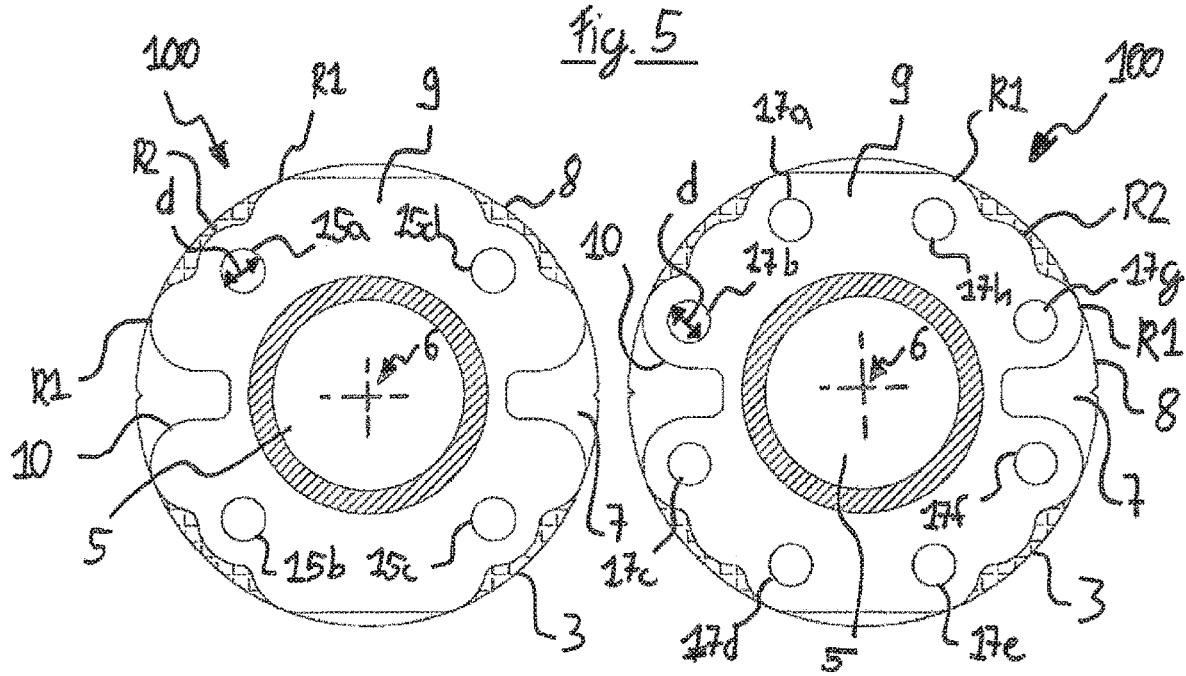

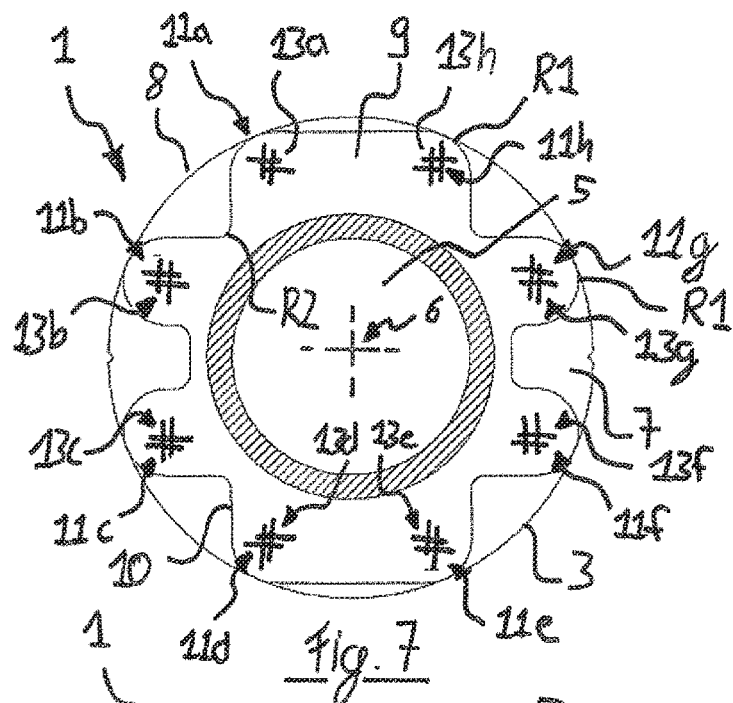
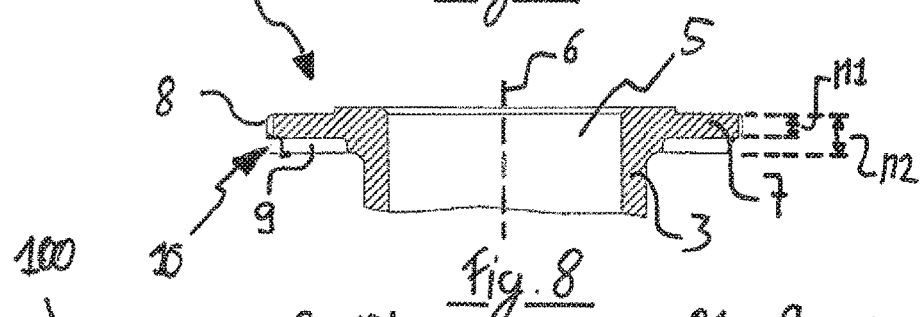
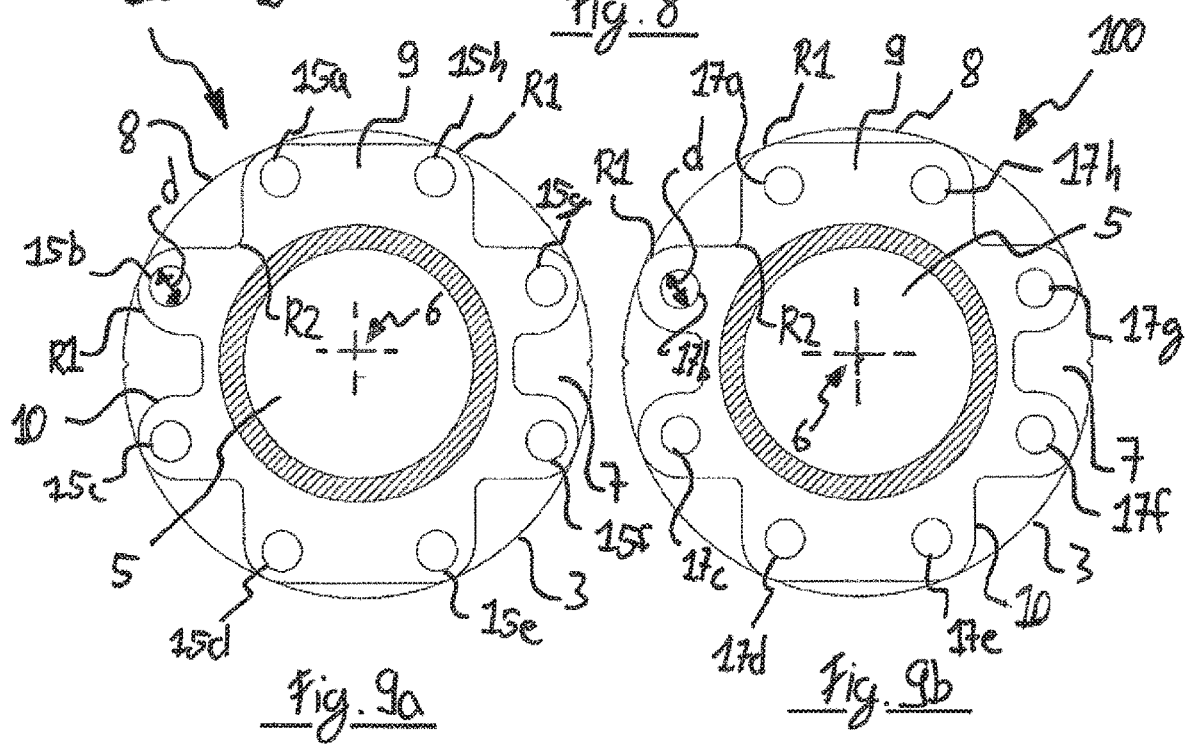

METHOD FOR PRODUCING A FLANGE BLANK AND FOR PRODUCING A FLANGE

PRIORITY CLAIM AND INCORPORATION BY REFERENCE

This application is a 35 U.S.C. § 371 application of International Application No. PCT/EP2016/079180, filed Nov. 30, 2016, which claims the benefit of German Application No. 10 2015 223 874.1, filed Dec. 1, 2015, each of which is incorporated by reference in its entirety.

TECHNICAL FIELD

The invention relates to a method for producing a flange blank, comprising the following step: producing a base body, wherein the base body comprises a fluid passage, a support section having a first material thickness, and a force-absorbing section having a second material thickness and the second material thickness is greater than the first material thickness.

The invention further relates to a method for producing a flange, wherein the method for producing a flange comprises the step of producing a number of flange blanks.

In addition, the invention relates to a flange blank for producing a flange, comprising a base body, which comprises a fluid passage, a support section having a first material thickness, and a force-absorbing section having a second material thickness, wherein the second material thickness is greater than the first material thickness.

BACKGROUND AND SUMMARY OF THE INVENTION

Flanges are used in various areas of application for the detachable connection of pipe sections. Through the use of flanges, a fluid-conducting connection is produced between the interconnected pipe sections.

Usually flanges have a base body with a fluid passage, wherein the base body can be welded to a pipe section. The base body of the flange can, for example, have an annular shoulder, which is configured for welding to the pipe section. It is therefore not necessary to push the flange onto the pipe section. Furthermore, flanges are known which are pushed onto the pipe section before the welding to the pipe section takes place.

Flanges also have a sealing surface surrounding the fluid passage. The sealing surfaces of two flanges can thus be connected to one another in a fluid-tight manner so that a fluid-conducting passage is produced through the base bodies of the interconnected flanges and consequently also between the pipe sections welded to the flanges.

In order to ensure a fluid-tight connection between two flanges, a pressing of the sealing sections of the flanges is necessary. The pressing pressure is usually produced by screw connections. For this purpose, the base bodies of the flanges to be interconnected have corresponding through-holes, in which screws can be inserted and then tightened by means of nuts.

Depending on the area of use of the flanges, the use of various drilling patterns has become established. In some areas of application, the drilling patterns to be used are even subject to binding standards.

One area of application of flanges is fire extinguishing system valves such as dry alarm valves, spray water valves, and wet alarm valves. In this area of application flanges are also used for integration of stone catchers and non-return valves.

In particular, in the area of fire extinguishing system valves, there is a need for flanges with different drilling patterns since the use of different drilling patterns has become established in various countries and regions of the world. Depending on the country or the region in which the flange is to be installed, the drilling patterns used can have a different number of through-holes and/or a different arrangement of the through-holes.

In order to reduce the material usage, the base body of a flange usually has a support section having a first material thickness and a force-absorbing section having a second material thickness. The second material thickness in the area of the force-absorbing section is greater than the first material thickness in the area of the support section, since the force-absorbing section has the through-holes for the screws which are used to press the sealing surfaces of the flanges. The introduction of force is accomplished in the contact region between base body and screw head or between base body and screw nut. As a result of the higher loading of the flange which occurs in this contact region, the force-absorbing section has a greater material thickness than the support section. Since no direct introduction of force into the support section of the flange takes place as a result of the screwing, said support section can have a smaller material thickness. This results in a saving of material in the manufacturing process and in a weight reduction of the flange.

Usually used to produce the flanges, are flange blanks the base body of which already corresponds to the desired flange basic shape but as yet has no through-holes according to a specific drilling pattern. In order to produce flanges with different drilling patterns, in the prior art different flange blanks are used, which have a base body whose support section and force-absorbing section are adapted to an individual drilling pattern to be introduced subsequently. Consequently, a saving of material is indeed achieved in the manufacture of flanges with different drilling patterns but the manufacture of different flange blanks requires a high production expenditure.

It is consequently the object of the present invention to provide a solution which reduces the manufacturing costs of flanges having different drilling patterns.

The object is solved by a method for producing a flange blank of the type mentioned initially, wherein the force-absorbing section is configured for the selective production of through-holes according to a first drilling pattern and/or a second drilling pattern.

The invention makes use of the finding that such a method provides a flange blank with which, regardless of whether a first drilling pattern, a second drilling pattern, or a combination of the first and the second drilling pattern is to be produced, a saving of material is achieved and at the same time the need for several flange blanks to produce flanges with different drilling patterns is overcome. The first drilling pattern and the second drilling pattern can therefore differ for example in the number of through-holes and in the arrangement of the through-holes.

Preferably the base body of the flange blank has sections with further material thicknesses, which differ from the first material thickness and the second material thickness. For example, the base body has a pipe-connecting section, which is configured as a shoulder and has an elevated annular surface for welding to a pipe section. In particular, a method in which the first drilling pattern corresponds to a first standard and the second drilling pattern corresponds to a second standard is preferred. Preferably the first drilling pattern and/or the second drilling pattern correspond to a standard selected from the list consisting of DIN EN 1092-1, DIN EN 1092-2, DIN EN 1092-3, DIN 2501-1 and ANSI B16.5.

In a preferred embodiment of the method according to the invention for producing a flange blank, the step of producing a base body comprises the following step:

producing a flange blank casting by means of a casting method.

Preferably the flange blank casting is produced by means of a die casting method, a permanent mold casting method, a plastic injection molding method, a low-pressure casting method, or a casting method using a lost mold.

Flange blank castings made of different metallic materials such as, for example, aluminum, zinc, magnesium, or silicon tombac can be produced cost-effectively and in large numbers by means of the die casting method. Flange blank castings can also be produced cost-effectively and in large numbers from steel by means of the permanent mold casting method. Furthermore, the plastic injection molding method is advantageous for complex flange blank casting geometries.

Alternatively or in addition, the method according to the invention for producing a flange blank comprises the following step:

reworking the flange blank casting by means of a machining method.

Preferably the reworking of the flange blank casting by means of a machining method comprises the deburring of the flange blank casting, for example by grinding surface sections of the base body, milling a planar sealing surface, milling out a groove for a sealing element, drilling the fluid passage of the base body, and/or removing sprue bodies, for example a feeder or riser in the filling and ventilation area of the flange blank casting.

The method according to the invention for producing a flange blank is further advantageously developed in that a flange blank casting is produced by means of a casting method using a multipart, in particular two-part, casting mold. By using only one casting mold, flange blanks for producing flanges for different markets can thus be produced. This results in a further reduction in the cost expenditure. When a multipart casting mold is used, recesses, for example for producing the support section and force-absorbing section, can be introduced in different directions into the flange blank. Thus, the use of a two-part casting mold allows recesses to be produced in at least two directions and the use of a four-part casting mold allows recesses to be produced in at least four directions.

The object is further solved by a method for producing a flange of the type mentioned initially, wherein the method comprises the following steps:

producing a number of flange blanks according to one of the previously described embodiments of the method for producing a flange blank; and selectively producing through-holes according to a first drilling pattern and/or a second drilling pattern in the force-absorbing section of the base body.

Since, after the method for producing the flange blank, the force-absorbing section is already configured for the selective production of through-holes according to a first drilling pattern and/or a second drilling pattern, through-holes according to a first drilling pattern, a second drilling pattern or through-holes according to a combination of the first and the second drilling pattern can now be introduced into the force-absorbing section. The method according to the invention for producing a blank consequently allows various flanges to be produced from a flange blank, wherein the various flanges differ in their drilling pattern, i.e. in the arrangement and number of through-holes introduced.

In an advantageous embodiment of the method according to the invention for producing a flange, the step of selectively producing through-holes according to a first drilling pattern and/or a second drilling pattern in the force-absorbing section of the base body comprises one, several, or all of the following steps:

producing a first number of bores according to the first drilling pattern in the force-absorbing section of the base body;

producing bores in a first arrangement according to the first drilling pattern in the force-absorbing section of the base body;

producing a second number of bores according to the second drilling pattern in the force-absorbing section of the base body;

producing bores in a second arrangement according to the second drilling pattern in the force-absorbing section of the base body.

In a particularly preferred embodiment of the method according to the invention for producing a flange, the step of selectively producing through-holes according to a first drilling pattern and/or a second drilling pattern in the force-absorbing section of the base body comprises one of the following steps:

selecting and using a first casting insert to produce through-holes according to the first drilling pattern;

selecting and using a second casting insert to produce through-holes according to a second drilling pattern;

selecting and using a third casting insert to produce through-holes according to the first and the second drilling pattern.

In addition to the possibility of drilling through-holes, through-holes can be produced already during the casting process. Since the first drilling pattern differs from the second drilling pattern in the number of the through-holes and/or the arrangement of the through-holes, different casting inserts must be used to produce the first drilling pattern and the second drilling pattern. If, by means of the method according to the invention for producing a flange, a flange which has both the through-holes according to the first drilling pattern and also the through-holes according to the second drilling pattern is to be produced, a third casting insert must thus be used. Alternatively, the first casting insert and the second casting insert can be used simultaneously to produce a flange having the through-holes according to the first and the second drilling pattern.

The method according to the invention for producing a flange is further advantageously developed in that by means of the method for producing a flange blank according to one of the previously described embodiments, a plurality of identical flange blanks are produced before through-holes according to the first drilling pattern are produced in the force-absorbing section of the base body of a first flange blank and through-holes according to the second drilling pattern are produced in the force-absorbing section of the base body of a second flange blank. Further preferred is a method for producing a flange in which through-holes according to the first and the second drilling pattern are produced in the force-absorbing section of the base body of a third flange blank.

The object is further solved by a flange blank for producing a flange of the type mentioned initially, wherein the force-absorbing section is configured for the selective production of through-holes according to a first drilling pattern and/or a second drilling pattern.

With regard to the advantages of the flange blank according to the invention, reference is made to the advantages of the method according to the invention for producing a flange blank and to the advantages of the method according to the invention for producing a flange.

In a preferred embodiment of the flange blank according to the invention, the force-absorbing section is adapted to surround fully circumferentially central axes of the through-holes of the first drilling pattern and the second drilling pattern. Since the central axes of the through-holes of the first drilling pattern and the second drilling pattern are surrounded fully circumferentially by the force-absorbing section, through-holes can be produced which are also fully circumferentially surrounded by the force-absorbing section. The force-absorbing section has a greater material thickness than the support section. Thus, the force introduced by the respective screw head or the associated nut into the flange is received fully circumferentially by the force-absorbing section, i.e. by a base body section having a high material thickness.

In a further embodiment of the flange blank according to the invention, the fluid passage extends along a longitudinal axis, wherein the force-absorbing section in a plane orthogonal to the longitudinal axis has an outer contour which is preferably configured to be rotationally symmetrical about the longitudinal axis or mirror-symmetrical with respect to an axis of symmetry through which the longitudinal axis runs. As a result of a rotationally symmetrical outer contour of the force-absorbing section, a particularly homogeneous introduction of force is accomplished in the case of suitable drilling patterns. As a result of the homogeneous introduction of force, stress peaks inside the base body of the subsequent flange are avoided so that the material thickness of the force-absorbing section and the material thickness of the support section can be reduced without resulting in an impairment of the load-bearing capacity of the subsequent flanges. In the case of other drilling patterns, a mirror-symmetrical outer contour of the force-absorbing section is advantageous and results in a homogeneous force distribution inside the base body. In particular, in the case of drilling patterns which have a first group of through-holes on a first side of the flange and a second group of through-holes on a second opposite side of the flange, a mirror-symmetrical configuration of the outer contour of the force-absorbing section results in a more homogeneous force flow inside the base body.

Further preferred is a flange blank in which the outer contour of the force-absorbing section comprises rounded sections, wherein one or more first rounded sections have a first radius and one or more second rounded sections have a second radius. The first radius preferably differs from the second radius. As a result of the provision of radii, stress peaks are also avoided inside the base body. This consequently allows a further reduction in the material thickness of the force-absorbing section and the support section of the base body. Preferably the outer contour of the force-absorbing section comprises one or more third rounded sections having a third radius, wherein the third radius differs from the first radius and the second radius. The positioning or arrangement as well as the size of the individual radii is preferably adapted to the first drilling pattern and/or the second drilling pattern.

In a further preferred embodiment of the flange blank according to the invention, one or more radii of the rounded sections each run coaxially to a central axis of a through-hole of the first drilling pattern or the second drilling pattern.

Further preferred is a flange blank in which the support section has an outer contour running orthogonally to the central axis which is configured to be substantially circular. The forces introduced by the force-absorbing section into the support section of the base body can be distributed particularly homogeneously inside the base body as a result of the circularly configured outer contour so that a further reduction in the material thickness of the support section is possible.

The object is further solved by the use of a flange blank according to one of the previously described embodiments in a method for producing a flange according to one of the previously described embodiments.

With regard to the advantages of the use according to the invention, reference is made to the advantages of the method according to the invention for producing a flange blank, the advantages of the method according to the invention for producing a flange and to the advantages of the flange blank according to the invention.

Insofar as the formulation "and/or" was used further above, it is understood herein that one, a plurality of, or all the elements mentioned in the list can be meant. The formulation "comprising" should be understood as a non-exhaustive list.

BRIEF DESCRIPTION OF THE DRAWINGS

The invention is explained in greater detail hereinafter with reference to the appended figures on the basis of preferred exemplary embodiments. In the figures:

FIG. 1 shows an exemplary embodiment of the flange blank according to the invention in a plan view;

FIG. 2 shows the flange blank from FIG. 1 in a lateral sectional illustration;

FIG. 3a shows a flange produced from the flange blank from FIG. 1, having a first drilling pattern;

FIG. 3b shows a flange produced from the flange blank from FIG. 1, having a second drilling pattern;

FIG. 4 shows an exemplary embodiment of the flange blank according to the invention in a plan view;

FIG. 5 shows the flange blank from FIG. 4 in a lateral sectional illustration;

FIG. 6a shows a flange produced from the flange blank from FIG. 4, having a first drilling pattern;

FIG. 6b shows a flange produced from the flange blank from FIG. 4, having a second drilling pattern;

FIG. 7 shows an exemplary embodiment of the flange blank according to the invention in a plan view;

FIG. 8 shows the flange blank from FIG. 7 in a lateral sectional illustration;

FIG. 9a shows a flange produced from the flange blank from FIG. 7, having a first drilling pattern;

FIG. 9b shows a flange produced from the flange blank from FIG. 7, having a second drilling pattern;

MODE(S) FOR CARRYING OUT THE INVENTION

Figure 10:
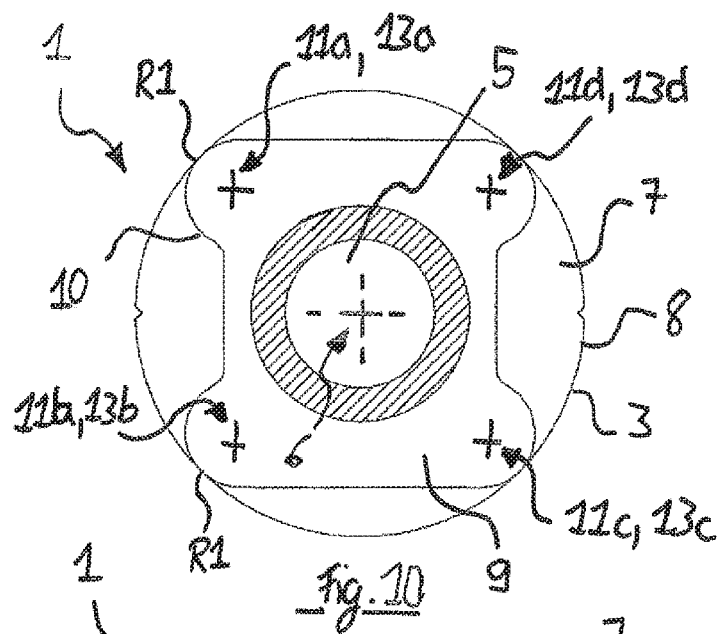
FIG. 10 shows an exemplary embodiment of the flange blank according to the invention in a plan view.

According to FIG. 1, the flange blank 1 has a base body 3, which comprises a fluid passage 5, a support section 7, and a force-absorbing section 9. The force-absorbing section 9 is configured for the selective production of through-holes according to a first drilling pattern and/or a second drilling pattern.

Eight central axes 11a-11h of the through-holes of the first drilling pattern to be introduced extend through the force-absorbing section 9. Furthermore, twelve central axes 13a-13l of the through-holes of the second drilling pattern to be introduced extend through the force-absorbing section 9. The central axes 11a-11h, 13a-13l of the through-holes of the first drilling pattern and the second drilling pattern are surrounded fully circumferentially by the force-absorbing section 9.

The fluid passage 5 extends along a longitudinal axis 6, wherein the force-absorbing section 9 has an outer contour 10 in a plane orthogonal to the longitudinal axis 6. The outer contour 10 is mirror-symmetrical with respect to a plane of symmetry through which the longitudinal axis 6 runs.

The outer contour 10 of the force-absorbing section 9 comprises a plurality of rounded sections. A plurality of first rounded sections of the outer contour 10 of the force-absorbing section 9 have a first radius R1. A plurality of second rounded sections of the outer contour 10 of the force-absorbing section 9 have a second radius R2. A plurality of third rounded sections of the outer contour 10 of the force-absorbing section 9 have a third radius R3.

The radii R1 of the first rounded sections of the outer contour 10 of the force-absorbing section 9 run coaxially to the central axes 13c, 13d, 13i, 13j of the through-holes of the second drilling pattern.

The radii R2 of the second rounded sections run coaxially to the central axes 11b, 11c, 11f, 11g of the through-holes of the first drilling pattern.

The radii R3 of the fourth rounded sections run coaxially to the central axes 13b, 13e, 13h, 13k of the through-holes of the second drilling pattern.

The support section 7 of the flange blank 1 has an outer contour 8 running orthogonally to the central axis 6 which is configured to be substantially circular. The outer contour 8 of the support section 7 has only two opposite notches, which lie inside the plane of symmetry of the mirror-symmetrically configured force-absorbing section 9.

According to FIG. 2, the flange blank 1 comprises the base body 3, which forms the fluid passage 5, the support section 7, and the force-absorbing section 9. The support section 7 has a first material thickness M1. The force-absorbing section 9 has a second material thickness M2. The second material thickness M2 is greater than the first material thickness M1.

The flange blank from FIG. 1 and FIG. 2 is produced by means of the method according to the invention for producing a flange blank. The method used comprises the following steps:
  producing a base body 3, wherein the base body 3 comprises a fluid passage 5, a support section 7 having a first material thickness M1 and a force-absorbing section 9 having a second material thickness M2, the second material thickness M2 is greater than the first material thickness M1 and the force-absorbing section 9 is configured for the selective production of through-holes 15a-15h, 17a-17l (see FIGS. 3a and 3b) according to a first drilling pattern and/or a second drilling pattern.

The production according to the invention of the base body 3 comprises the following steps:

producing a flange blank casting by means of a casting method using a multipart, in particular two-part, casting mold; and
  reworking the flange blank casting by means of a machining method.

The flange 100 according to FIG. 3a was produced from a flange blank 1 according to FIG. 1. The flange 100 has eight through-holes 15a-15h. The through-holes 15a-15h extend along the central axes 11a-11h shown in FIG. 1. The arrangement and number of through-holes 15a-15h correspond to the first drilling pattern. The through-holes 15a-15h have a diameter d.

The flange 100 according to FIG. 3b was also produced from a flange blank 1 according to FIG. 1. The flange 100 has twelve through-holes 17a-17l. The through-holes 17a-17l extend along the central axes 13a-13l shown in FIG. 1. The arrangement and number of through-holes 17a-17l correspond to the second drilling pattern. The through-holes 17a-17l have a diameter d.

The flanges 100 from FIGS. 3a and 3b are produced by means of the method according to the invention for producing a flange 100. The method used comprises the following steps:
  producing two identical flange blanks 1 by means of the method according to the invention for producing a flange blank 1, and
  selectively producing through-holes 15a-15h, 17a-17l according to a first and/or second drilling pattern in the force-absorbing section 9 of the base body 3.

The step of producing the through-holes 15a-15h according to the first drilling pattern in the force-absorbing section 9 of the base body comprises the following steps:
  producing eight bores according to the first drilling pattern in the force-absorbing section 9 of the base body 3;
  producing bores in a first arrangement according to the first drilling pattern in the force-absorbing section 9 of the base body 3.

The step of producing the through-holes 17a-17l according to the second drilling pattern in the force-absorbing section 9 of the base body comprises the following steps:
  producing twelve bores according to the second drilling pattern in the force-absorbing section 9 of the base body 3;
  producing bores in a second arrangement according to the second drilling pattern in the force-absorbing section 9 of the base body 3.

According to FIG. 4, the flange blank 1 has a base body 3, which comprises a fluid passage 5, a support section 7, and a force-absorbing section 9. The force-absorbing section 9 is configured for the selective production of through-holes according to a first drilling pattern and/or a second drilling pattern.

Four central axes 11a-11 of the through-holes of the first drilling pattern to be introduced extend through the force-absorbing section 9. Furthermore, eight central axes 13a-13h of the through-holes of the second drilling pattern to be introduced extend through the force-absorbing section 9. The central axes 11a-11d, 13a-13h of the through-holes of the first drilling pattern and the second drilling pattern are surrounded fully circumferentially by the force-absorbing section 9.

The fluid passage 5 extends along a longitudinal axis 6, wherein the force-absorbing section 9 has an outer contour 10 in a plane orthogonal to the longitudinal axis 6. The outer contour 10 is mirror-symmetrical with respect to a plane of symmetry through which the longitudinal axis 6 runs.

The outer contour 10 of the force-absorbing section 9 comprises a plurality of rounded sections. A plurality of first rounded sections of the outer contour 10 of the force-absorbing section 9 have a first radius R1. A plurality of second rounded sections of the outer contour 10 of the force-absorbing section 9 have a second radius R2.

The radii R1 of the first rounded sections of the outer contour 10 of the force-absorbing section 9 run coaxially to the central axes 13a-13h of the through-holes of the second drilling pattern.

The radii R2 of the second rounded sections run coaxially to the central axes 11a-11d of the through-holes of the first drilling pattern.

The support section 7 of the flange blank 1 has an outer contour 8 running orthogonally to the central axis 6, which is configured to be substantially circular. The outer contour 8 of the support section 7 has only two opposite notches, which lie inside the plane of symmetry of the mirror-symmetrically configured force-absorbing section 9.

According to FIG. 5, the flange blank 1 comprises the base body 3, which forms the fluid passage 5, the support section 7, and the force-absorbing section 9. The support section 7 has a first material thickness M1. The force-absorbing section 9 has a second material thickness M2. The second material thickness M2 is greater than the first material thickness M1.

The flange 100 according to FIG. 6a was produced from a flange blank 1 according to FIG. 4. The flange 100 has four through-holes 15a-15d. The through-holes 15a-15d extend along the central axes 11a-11d shown in FIG. 4. The arrangement and number of through-holes 15a-15d correspond to the first drilling pattern. The through-holes 15a-15d have a diameter d.

The flange 100 according to FIG. 6b was also produced from a flange blank 1 according to FIG. 4. The flange 100 has eight through-holes 17a-17h. The through-holes 17a-17h extend along the central axes 13a-13h shown in FIG. 4. The arrangement and number of through-holes 17a-17h correspond to the second drilling pattern. The through-holes 17a-17h have a diameter d.

According to FIG. 7, the flange blank 1 comprises a base body 3, which comprises a fluid passage 5, a support section 7, and a force-absorbing section 9. The force-absorbing section 9 is configured for the selective production of through-holes according to a first drilling pattern and/or a second drilling pattern.

Eight central axes 11a-11h of the through-holes of the first drilling pattern to be introduced extend through the force-absorbing section 9. Furthermore, eight central axes 13a-13h of the through-holes of the second drilling pattern to be introduced extend through the force-absorbing section 9. The central axes 11a-11h, 13a-13h of the through-holes of the first drilling pattern and the second drilling pattern are surrounded fully circumferentially by the force-absorbing section 9.

The fluid passage 5 extends along a longitudinal axis 6, wherein the force-absorbing section 9 has an outer contour 10 in a plane orthogonal to the longitudinal axis 6. The outer contour 10 is mirror-symmetrical with respect to a plane of symmetry through which the longitudinal axis 6 runs.

The outer contour 10 of the force-absorbing section 9 comprises a plurality of rounded sections. A plurality of first rounded sections of the outer contour 10 of the force-absorbing section 9 have a first radius R1.

The radii R1 of the first rounded sections of the outer contour 10 of the force-absorbing section 9 run coaxially to the central axes 13a-13h of the through-holes of the second drilling pattern.

The support section 7 of the flange blank 1 has an outer contour 8 running orthogonally to the central axis 6 which is configured to be substantially circular. The outer contour 8 of the support section 7 has only two opposite notches, which lie inside the plane of symmetry of the mirror-symmetrically configured force-absorbing section 9.

According to FIG. 8, the flange blank 1 comprises the base body 3, which forms the fluid passage 5, the support section 7, and the force-absorbing section 9. The support section 7 has a first material thickness M1. The force-absorbing section 9 has a second material thickness M2. The second material thickness M2 is greater than the first material thickness M1.

The flange 100 according to FIG. 9a was produced from a flange blank 1 according to FIG. 7. The flange 100 has eight through-holes 15a-15h. The through-holes 15a-15h extend along the central axes 11a-11h shown in FIG. 7. The arrangement and number of through-holes 15a-15h correspond to the first drilling pattern. The through-holes 15a-15h have a diameter d.

The flange 100 according to FIG. 9b was also produced from a flange blank 1 according to FIG. 7. The flange 100 has eight through-holes 17a-17h. The through-holes 17a-17h extend along the central axes 13a-13h shown in FIG. 7. The arrangement and number of through-holes 17a-17h correspond to the second drilling pattern. The through-holes 17a-17h have a diameter d.

According to FIG. 10, the flange blank 1 comprises a base body 3, which comprises a fluid passage 5, a support section 7, and a force-absorbing section 9. The force-absorbing section 9 is configured for the selective production of through-holes according to a first drilling pattern and/or a second drilling pattern.

Four central axes 11a-11d of the through-holes of the first drilling pattern to be introduced extend through the force-absorbing section 9. Furthermore, four central axes 13a-13d of the through-holes of the second drilling pattern to be introduced extend through the force-absorbing section 9. The central axes 11a-11d, 13a-13d of the through-holes of the first drilling pattern and the second drilling pattern are surrounded fully circumferentially by the force-absorbing section 9.

The fluid passage 5 extends along a longitudinal axis 6, wherein the force-absorbing section 9 has an outer contour 10 in a plane orthogonal to the longitudinal axis 6. The outer contour 10 is mirror-symmetrical with respect to a plane of symmetry through which the longitudinal axis 6 runs.

The outer contour 10 of the force-absorbing section 9 comprises a plurality of rounded sections. A plurality of first rounded sections of the outer contour 10 of the force-absorbing section 9 have a first radius R1.

The radii R1 of the first rounded sections of the outer contour 10 of the force-absorbing section 9 run coaxially to the central axes 11a-11d, 13a-13d of the through-holes of the first and the second drilling pattern.

The support section 7 of the flange blank 1 has an outer contour 8 running orthogonally to the central axis 6 which is configured to be substantially circular. The outer contour 8 of the support section 7 has only two opposite notches, which lie inside the plane of symmetry of the mirror-symmetrically configured force-absorbing section 9.

Figure 11:
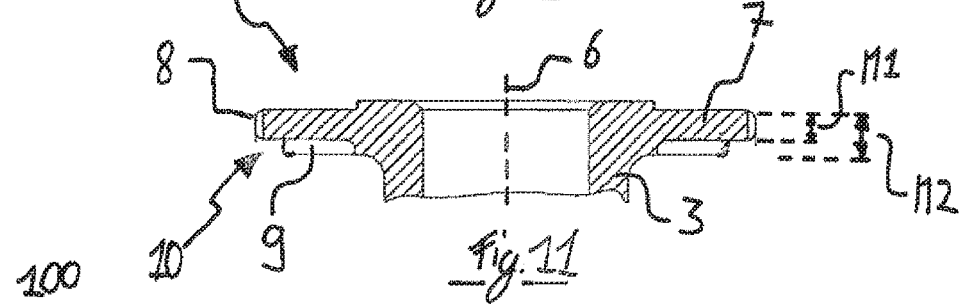
FIG. 11 shows the flange blank from FIG. 10 in a lateral sectional illustration.

According to FIG. 11, the flange blank 1 comprises the base body 3, which forms the fluid passage 5, the support section 7, and the force-absorbing section 9. The support section 7 has a first material thickness M1. The force-absorbing section 9 has a second material thickness M2. The second material thickness M2 is greater than the first material thickness M1.

Figures 12A, 12B:
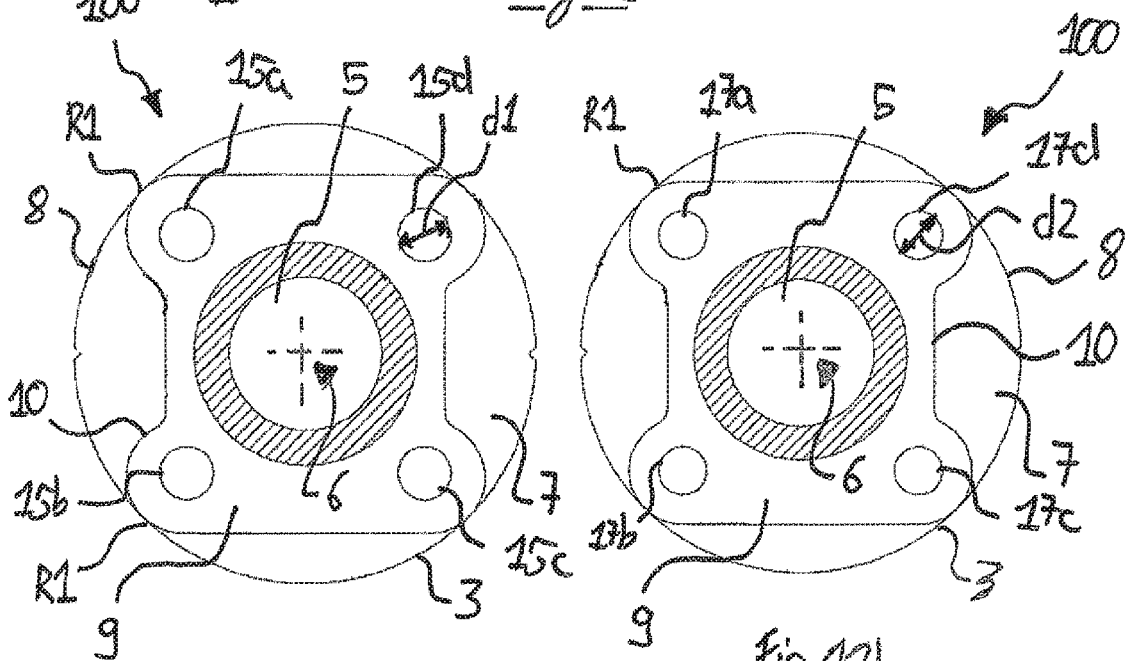
FIG. 12a shows a flange produced from the flange blank from FIG. 10, having a first drilling pattern.
FIG. 12b shows a flange produced from the flange blank from FIG. 10, having a second drilling pattern.

The flange 100 according to FIG. 12a was produced from a flange blank 1 according to FIG. 10. The flange 100 has four through-holes 15a-15d. The through-holes 15a-15d extend along the central axes 11a-11d shown in FIG. 10. The arrangement and number of through-holes 15a-15d correspond to the first drilling pattern. The through-holes 15a-15d have a diameter d1.

The flange 100 according to FIG. 12b was also produced from a flange blank 1 according to FIG. 10. The flange 100 has four through-holes 17a-17d. The through-holes 17a-17d extend along the central axes 13a-13d shown in FIG. 10. The arrangement and number of through-holes 17a-17d correspond to the second drilling pattern. The through-holes 17a-17d have a diameter d2.

LIST OF UTILIZED REFERENCE NUMBERS

1 Flange blank
3 Base body
5 Fluid passage
6 Longitudinal axis
7 Support section
8 Outer contour of support section
9 Force-absorbing section
10 Outer contour of force-absorbing section
11a-11h Central axes
13a-13l Central axes
15a-15h Through-holes
17a-17l Through-holes
100 Flange
d, d1, d2 Recess diameters
M1, M2 Material thicknesses
R1-R3 Radii

The invention claimed is:

1. A method for producing a flange blank, comprising the following steps: producing a base body, wherein the base body comprises a fluid passage extending along a longitudinal axis, a support section having a first material thickness, a force-absorbing section having a second material thickness, the second material thickness being greater than the first material thickness, and through-holes, each of the through-holes extending entirely through the force-absorbing section and the support section of the base body; wherein the force-absorbing section is configured for the production of the through-holes selectively according to a first drilling pattern and a second drilling pattern, wherein the force-absorbing section in a plane orthogonal to the longitudinal axis has an outer contour which is configured to be rotationally symmetrical about the longitudinal axis and mirror-symmetrical with respect to a plane of symmetry through which runs the longitudinal axis, and providing the outer contour of the force-absorbing section with non-uniform rounded sections, wherein the rounded sections include one or more first rounded sections having a first radius and one or more second rounded sections having a second radius different than the first radius, wherein the first radius and the second radius are located radially outward of the through-holes of the first drilling pattern and/or the second drilling pattern, and wherein a position, arrangement and/or size of the individual radii is non-uniform with respect to the first drilling pattern and/or the second drilling pattern.

2. The method as claimed in claim 1, wherein an outer contour of the support section defines an outer most contour of the flange blank and the outer contour of the support section is substantially circular.

3. The method as claimed in claim 1, wherein the through-holes comprise an even number of through-holes.

4. The method as claimed in claim 1, wherein the support section comprises two opposite notches that lie inside the plane of symmetry through which runs the longitudinal axis.

5. The method as claimed in claim 1, wherein the step of producing a base body comprises one or both of the following steps:
   producing a flange blank casting by a casting method;
   reworking the flange blank casting by a machining method.

6. The method as claimed in claim 5, wherein the flange blank casting is produced by using a two-part, casting mold.

7. A method for producing a flange, comprising the following steps:
   producing a number of flange blanks by the method as claimed in claim 1, and
   selectively producing through-holes according to at least one of the first drilling pattern and/or the second drilling pattern in the force-absorbing section of the base body.

8. The method as claimed in claim 7, wherein the step of selectively producing through-holes according to a first drilling pattern and/or a second drilling pattern in the force-absorbing section of the base body comprises one, several, or all of the following steps:
   producing a first number of bores according to the first drilling pattern in the force-absorbing section of the base body;
   producing bores in a first arrangement according to the first drilling pattern in the force-absorbing section of the base body;
   producing a second number of bores according to the second drilling pattern in the force-absorbing section of the base body;
   producing bores in a second arrangement according to the second drilling pattern in the force-absorbing section of the base body.

9. The method as claimed in claim 7, wherein the step of selectively producing through-holes according to a first drilling pattern and/or a second drilling pattern in the force-absorbing section of the base body comprises one of the following steps:
   selecting and using a first casting insert to produce through-holes according to the first drilling pattern;
   selecting and using a second casting insert to produce through-holes according to the second drilling pattern;
   selecting and using a third casting insert to produce through-holes according to the first and the second drilling pattern.

10. The method as claimed in one of claims 7 to 9, further comprising
   a plurality of identical flange blanks before through-holes according to the first drilling pattern are produced in the force-absorbing section of the base body of a first flange blank and through-holes according to the second drilling pattern are produced in the force-absorbing section of the base body of a second flange blank.

11. A flange blank for producing a flange, comprising a base body which comprises a fluid passage extending along a longitudinal axis, a support section having a first material thickness and a force-absorbing section having a second material thickness, and through-holes, each of the through-holes extending entirely through the force-absorbing section and the support section of the base body, wherein the second material thickness is greater than the first material thickness, wherein the force-absorbing section is configured for the production of the through-holes selectively according to a first drilling pattern and a second drilling pattern, wherein the force-absorbing section in a plane orthogonal to the longitudinal axis has an outer contour which is configured to be rotationally symmetrical about the longitudinal axis and mirror-symmetrical with respect to a plane of symmetry through which runs the longitudinal axis, wherein the outer contour of the force-absorbing section comprises non-uniform rounded sections, wherein the rounded sections include one or more first rounded sections having a first radius and one or more second rounded sections having a second radius different than the first radius, wherein the first radius and the second radius are located radially outward of the through-holes of the first drilling pattern and/or the second drilling pattern, and wherein a position, arrangement, and/or size of the individual radii is non-uniform with respect to the first drilling pattern and/or the second drilling pattern.

12. The flange blank as claimed in claim 11, wherein the force-absorbing section is adapted to fully surround central axes of the through-holes of the first drilling pattern and second drilling pattern.

13. The flange blank as claimed in claim 12, wherein one or more of the radii of the rounded sections each run coaxially to a central axis of the through-holes of the first drilling pattern or the second drilling pattern.

14. A method for producing a flange blank, comprising the following steps: producing a base body, wherein the base body comprises a fluid passage extending along a longitudinal axis, a support section having a first material thickness and a force-absorbing section having a second material thickness, the second material thickness being greater than the first material thickness, and through-holes, each of the through-holes extending entirely through the force-absorbing section and the support section of the base body; wherein the force-absorbing section is configured for the production of the through-holes selectively according to a first drilling pattern and a second drilling pattern, wherein the force-absorbing section in a plane orthogonal to the longitudinal axis has an outer contour which is configured to be rotationally symmetrical about the longitudinal axis or mirror-symmetrical with respect to a plane of symmetry through which runs the longitudinal axis, and providing the outer contour of the force-absorbing section with non-uniform rounded sections, wherein the rounded sections include one or more first rounded sections having a first radius and one or more second rounded sections having a second radius different than the first radius, wherein the first radius and the second radius are located radially outward of the through-holes of the first drilling pattern and/or the second drilling pattern, and wherein a position, arrangement and/or size of the individual radii is non-uniform with respect to the first drilling pattern and/or the second drilling pattern; wherein the through-holes comprise an even number of through-holes, and/or wherein the support section comprises two opposite notches that lie inside the plane of symmetry through which runs the longitudinal axis, and wherein each of the through-holes is disposed on a side of the plane of symmetry.

15. The method as claimed in claim 14, wherein an outer contour of the support section defines an outer most contour of the flange blank and the outer contour of the support section is substantially circular.

16. The method as claimed in claim 1, wherein the through-holes comprise an even number of through-holes, and wherein the support section comprises two opposite notches that lie inside the plane of symmetry through which runs the longitudinal axis, and wherein each of the through-holes is disposed on a side of the plane of symmetry.

* * * * *